United States Patent [19]

Swales

[11] 3,981,964

[45] Sept. 21, 1976

[54] SODIUM SULPHATE COMPOSITIONS AND THEIR PRODUCTION

[75] Inventor: Danvers A. Swales, Stockton-on-Tees, England

[73] Assignee: British Chrome & Chemicals Limited, Stockton-on-Tees, England

[22] Filed: Dec. 3, 1974

[21] Appl. No.: 529,177

[30] Foreign Application Priority Data

Dec. 7, 1973 United Kingdom............... 56844/73

[52] U.S. Cl.................................. 423/53; 423/179; 423/202; 423/267; 423/268; 423/551
[51] Int. Cl.²..................... C01G 37/14; C01D 5/00
[58] Field of Search ............... 252/383, 385; 71/63, 71/64 A, 64 E, 64 F; 423/267, 551, 53, 179, 202, 268

[56] References Cited

UNITED STATES PATENTS

| | | | |
|---|---|---|---|
| 1,429,912 | 9/1922 | D'Adrian............................ | 423/551 |
| 3,715,425 | 2/1973 | Morgan et al. ....................... | 423/53 |
| 3,766,028 | 10/1973 | Crowther............................ | 423/551 |

*Primary Examiner*—Earl C. Thomas
*Assistant Examiner*—Wayne A. Langel
*Attorney, Agent, or Firm*—Lawrence Rosen; E. Janet Berry

[57] ABSTRACT

Chrome saltcake has stable free flowing properties imparted to it by subjecting the sodium dichromate impurity present in chrome saltcake to reaction to form a product that is less susceptible to absorption of moisture than sodium dichromate.

13 Claims, No Drawings

SODIUM SULPHATE COMPOSITIONS AND THEIR PRODUCTION

In the production of sodium dichromate from chromite ore, a common process comprises treating an aqueous solution of sodium chromate with sulphuric acid and partially evaporating the mixture to give a slurry of sodium sulphate crystals in hot concentrated sodium dichromate liquor. After being separated from the hot liquor, the sodium sulphate is washed with hot water and dried. The resultant impure product is known as chrome saltcake and typically contains 97–99.5% $Na_2SO_4$, the main impurity normally being sodium dichromate together with minor amounts of sodium chromate and other metallic salts. One of the major outlets for this product is in the treatment of wood pulp, very large tonnages being sold annually for this purpose.

Normally the sodium sulphate is present in the dried saltcake in the anhydrous form and so the freshly produced chrome saltcake is a fine, dry crystalline powder with a moisture content rarely exceeding 0.1%. In this condition the material is free-flowing and can readily be handled for example by either mechanical or pneumatic conveying equipment.

Unfortunately the free-flowing properties are not stable in that they are impaired upon exposure of the pruduct to atmospheric humidity. This is a significant factor since it is common practice for the saltcake to be stored in bulk under cover for long periods before being dispatched to customers and during this time, and also while it is in transit, it is often exposed to moist atmospheres. As a result the potential user often finds that the initially free-flowing saltcake has absorbed during storage and transit enough moisture significantly to impair its flow properties. This presents an acute problem particularly in those many cases where the handler or user wishes to use pneumatic conveying equipment. In fact the problem can be so bad in some instances that by-product sodium sulphate from other industrial processes is often preferred, despite its higher initial cost, to chrome saltcake.

It has therefore been our object to devise a way of giving chrome saltcake (i.e. a mixture of sodium sulphate with sodium dichromate impurity) stable free-flowing properties.

According to the invention we find it is possible to make a particulate composition of sodium sulphate containing chromium compound impurity and having stable free-flowing properties from chrome saltcake by a process comprising subjecting the sodium dichromate in the cake to reaction to form a product that is less susceptible to absorption of moisture than sodium dichromate. The process may be applied to chrome saltcake that has previously been dried and which may be a crystalline, usually free-flowing, mixture or a damp lumpy mixture or it may be applied to saltcake during its production, usually after separating it from the bulk of the sodium dichromate liquors, and usually after washing the separated saltcake, but before drying, with the result that the saltcake is naturally moist. If the saltcake to be reacted is not moist it is generally desirable to add moisture to facilitate the reaction occurring. The total amount of moisture present during the reaction is not critical but it is generally preferred to be at least 3%, e.g. 3 to 10 or 20%, by weight. After the desired reaction is complete the modified chrome saltcake will then be dried, e.g. by heating.

It appears that the instability of the free-flowing properties of chrome saltcake is due largely to the presence of the sodium dichromate in the saltcake because, even in the small quantities present (as low as 0.5%), this is very susceptible to moisture and may absorb enough moisture from the atmosphere to impair the flow properties of the product. As a result of converting some or all of the sodium dichromate in the saltcake to form a product, comprising a chromium compound, being less susceptible to absorption of moisture, and generally having less tendency to absorb water vapour, the resultant modified chrome saltcake can no longer pick up sufficient moisture from the atmosphere to impair seriously its free-flowing properties.

The reaction is brought about by contacting the mixture of sodium sulphate and sodium dichromate with a reactant, that may be gaseous, solid or liquid (for example a solution of a solid) and either allowing reaction to occur or causing it to occur, for example by heating. The products of the reaction, and preferably also the reactant or reactants, are preferably either non-hygroscopic or are sufficiently less prone to absorb atmospheric moisture than sodium dichromate that the final product does have stable free-flowing properties.

Various types of reactants can be used to effect the reaction since various reactions can be used to achieve the change. In one the sodium dichromate is converted into other hexavalent chromium compounds, for example by a process comprising double decomposition with a salt of a cation other than sodium, for instance by subjecting the sodium dichromate in the mixture to double decomposition with such a salt, to form products which less readily absorb atmospheric moisture. In another method the sodium dichromate is reduced in the mixture to form products which less readily absorb atmospheric moisture, generally either trivalent chromium compounds or mixed trivalent and hexavalent chromium compounds such as those often referred to as chromium chromate complexes. Both double decomposition and reduction may be involved in the reaction of the sodium dichromate.

Preferred salts for bringing about double decomposition are the salts of mineral acids with ammonium or potassium but any other cation that does not introduce hygroscopic material and that can give a dichromate or chromate which less readily absorbs atmospheric moisture may be used. On economic grounds the mineral acid of the salt is preferably hydrochloric or sulphuric acid, sulphuric being preferred because it does not introduce further impurity in the saltcake and the formation of sodium sulphate adds to the sodium sulphate content of the product.

The double decomposition reaction is preferably conducted on the dichromate, and thus produces a different dichromate, which is generally inorganic. However it may also be conducted on sodium chromate, thus yielding a chromate. Thus the sodium dichromate may first be converted into sodium chromate by addition of a suitable alkali, followed by double decomposition of the sodium chromate with a salt to form products which absorb atmospheric moisture less readily than does sodium dichromate.

The salts can be introduced either as solids or as aqueous solutions although there must be sufficient moisture in the system to permit reaction. Thus if they are added as solids and if the saltcake has been dried it may need moistening with water. They may be added to preformed particulate chrome saltcake in the presence of moisture, the mixture then being thoroughly mixed and heated to bring about reaction. Usually, however, they are added after the sodium sulphate crystals have been separated from the sodium dichromate liquor and washed with water, but before they have been dried. Often the crystals are carried from the stage at which they are washed to the drier by a screw conveyor and conveniently the reactant (i.e. the salt) may be added into this screw, mixing thereby being achieved during transit to the drier. Drying may be at conventional temperatures, for example 100 to 130°C or higher. When using ammonium salts, some reduction of the hexavalent chromium present in the saltcake may take place if drying is carried out at high temperatures, for example above 200°C. This is due to the thermal decomposition of ammonium dichromate and is beneficial since it leads to the formation of products containing trivalent chromium which do not readily pick up moisture. Additionally the conversion of hexavalent chromium into trivalent chromium in this way provides benefits in terms of reduced toxicity.

The amount of salt needed to ensure that the treated saltcake retains acceptable flow properties depends upon the amount of sodium dichromate initially present in the saltcake and on the storage conditions to which the saltcake is subsequently to be subjected. Amounts of additive between 0.1 and 10 times that theoretically required to react completely with all the dichromate present can be used. Preferred amounts are generally from 0.5 to 3 times the theoretical amount but in some instances we find excess reactant gives decreasing advantage, possible because the reactant absorbs atmospheric moisture more readily than the product of the reaction. The preferred rates of addition are, in the case of the ammonium salts 0.5–1.0 times and in the case of the potassium salts 0.1–3.0 times those theoretically required to give complete reaction with the sodium dichromate present.

When the reaction is being brought about by reduction, any convenient organic or inorganic reducing agent can be used. Examples are pyrogallol, sodium dithionite, sulphur dioxide, sulphurous acid and, most preferably, salts of sulphurous acid. Other reducing agents that could be used include, for example, formaldehyde or stannous salts or other divalent salts that can be oxidised to a trivalent state, but these are all generally less desirable either for cost reasons or because of the by-products that are formed in the reaction.

Of the salts of sulphurous acid it is preferred to use the acid salts, i.e. the bisulphites or metabisulphites since, under the conditions which obtain during the production of chrome saltcake, they reduce sodium dichromate more rapidly than do the corresponding normal salts, i.e. the sulphites. For economic reasons it is advantageous to use sodium bisulphite or metabisulphite, but other acid sulphites may be used, for example those of potassium, ammonium or calcium.

Reducing agents which are solids may be introduced either as solids or as aqueous solutions in any convenient manner, for example in the same way as described above for the addition of salts for double decomposition. Thus they are preferably added after washing the sodium sulphate but before drying.

When sulphur dioxide or sulphurous acid are used, they may conveniently be added to saltcake by any suitable means, either before or during the drying operation.

The amounts of sulphur dioxide, sulphurous acid or sulphurous acid salts or other reducing agents which it is necessary to add to chrome saltcake in order to ensure that the treated material retains good flow characteristics, can be varied within wide limits, but are related to the amount of sodium dichromate initially present in the saltcake. Amounts of additive between 0.1 and 20 moles per mole of dichromate can be used. The higher amounts are generally only required when sulphite is used, because of the rather slow reaction, and it is generally found that 0.5 to 3.0 moles per mole of dichromate are adequate.

The following are some examples of the invention.

EXAMPLE 1

A 100 g sample of dry chrome saltcake, containing 0.82% w/w sodium dichromate was moistened with 5 ml of water, warmed to 45°C, and to the mixture was added 0.31 g of dry ammonium sulphate (equivalent to 75% of the amount theoretically required to react with the sodium dichromate present). The components were mixed together for ten minutes and were then dried at 120°C until free from moisture. The treated material was placed in an enclosed vessel containing air maintained at 80% relative humidity and 20°–25°C. An untreated sample of the same chrome saltcake was also placed in the vessel, for comparison. After twenty days, the treated saltcake was found to have a moisture content of 0.01% w/w and was completely free-flowing while the untreated material had a moisture content of 0.41% w/w and had poor flow properties.

EXAMPLE 2

A 100 g sample of dry chrome saltcake, containing 0.82% w/w sodium dichromate was moistened with 5 ml of water, warmed to 45°C, and to it was added 10 ml of a 16.3% w/w solution of potassium sulphate (equivalent to three times the amount theoretically required to react with the sodium dichromate present). The components were mixed together for ten minutes and were then dried at 120°C until free from moisture. The treated material was placed in an enclosed vessel containing air maintained at 80% relative humidity and 20°–25°C. An untreated sample of the same chrome saltcake was also placed in the vessel, for comparison. After twenty days, the treated saltcake was found to contain no moisture, and was completely free-flowing, while the untreated material had a moisture content of 0.41% w/w and had poor flow properties.

EXAMPLE 3

A 100 g sample of dry chrome saltcake, containing 0.82% w/w sodium dichromate was moistened with 5 ml of water, warmed to 45°C and to it was added 0.6 g of sodium metabisulphite (equivalent to 1 mole per mole of dichromate). The components were mixed together for ten minutes then dried at 120°C until free from moisture. The treated material was placed in an enclosed vessel containing air maintained at 80% relative humidity and 20°–25°C. An untreated sample of the same chrome saltcake was also placed in the vessel, for comparison. After twenty days, the treated saltcake was found to have a moisture content of 0.08% w/w and was completely free-flowing, while the untreated material had a moisture content of 0.41% w/w and had poor flow properties.

EXAMPLE 4

100 tons of chrome saltcake was separated from hot concentrated sodium dichromate solution by centrifugation. The saltcake was washed in the centrifuge with hot water to give a damp product with average moisture and sodium dichromate contents of 5% and 0.9% respectively. This material was mixed with 1% dry weight of sodium metabisulphite, the latter being added to a feed screw conveying the saltcake to a continuous dryer. After being dried in a stream of hot air at about 120°C the saltcake had an average moisture content of 0.05% and was conveyed pneumatically to a large store.

A similar quantity of saltcake which had not been treated with sodium metabisulphite was separately conveyed to the same store. The two lots of saltcake were stored under the same conditions for 6 months in an atmosphere at 5°–18°C and at a relative humidity of 60–85%. At the end of this time the treated saltcake had an average moisture content of 0.15% and was still perfectly free-flowing, whereas the untreated saltcake had an average moisture content of 0.5% and had poor flow characteristics.

The process of Example 4 may be repeated adding to the screw solid potassium sulphate, instead of the sodium metabisulphite. The product again has satisfactorily stable free-flowing properties.

EXAMPLE 5

A 100 g. sample of dry chrome saltcake containing 1.64% w/w sodium dichromate was moistened with 5 ml of water and to the mixture was added 0.82 g. ammonium sulphate (equivalent to 1 mole per mole of dichromate). The components were thoroughly mixed and were then heated at 600°C until free from moisture. The treated material, which had a greyish colour due to chemical reduction of the dichromate, was placed in an enclosed vessel containing air maintained at 85% relative humidity and 20°C. An untreated sample of the same chrome saltcake was also placed in the vessel for comparison. After three weeks the treated saltcake had a moisture content of 0.10% and was still free-flowing. By contrast the untreated material had picked up 2.55% of moisture and had extremely poor flow properties.

EXAMPLE 6

A 100 g. sample of dry chrome saltcake containing 1.64% w/w sodium dichromate was moistened with 5 ml of water and to the mixture was added 0.41 g. of pyrogallol (equivalent to 1 mole per mole of dichromate). The components were thoroughly mixed and then dried at 140°C until free from moisture. The treated material was placed in an enclosed vessel containing air maintained at 85% relative humidity and 20°C. An untreated sample of the same saltcake was also placed in the vessel for comparison. After three weeks the treated saltcake had a moisture content of 0.25% and was still free-flowing. The untreated material on the other hand had a moisture content of 2.55% and was very badly caked.

I claim:

1. A process of making a particulate composition of sodium sulphate containing chromium compound impurity and having stable, freeflowing, properties from chrome saltcake feed material containing sodium sulphate and sodium dichromate impurity, the process comprising subjecting the sodium dichromate to reduction in the presence of moisture to form a chrome saltcake product that is less susceptible to absorption of moisture than the chrome saltcake feed material, and the resulting composition is dried to freeflowing form.

2. A process according to claim 1 in which the chrome saltcake feed material is the damp cake obtained by separating chromium saltcake from sodium dichromate liquors and washing the cake and the said reduction is conducted before or while driving the damp cake to free-flowing form.

3. A process according to claim 1 in which the chrome saltcake feed material is the damp cake obtained by separating chromium saltcake from sodium dichromate liquors and washing the cake, and in which after washing the cake is carried by a screw conveyor to a drier in which it is dried and reactant necessary to effect said reduction is added into said screw conveyor.

4. A process according to claim 1 in which the chrome saltcake feed material has been predried.

5. A process according to claim 1 in which reduction is by reaction of the sodium dichromate with a reducing agent selected from salts of sulphurous acid, sulphur dioxide, sulphurous acid, sodium dithionite and pyrogallol.

6. A process according to claim 1 in which reduction is by reaction of the sodium dichromate with sodium bisulphite or sodium metbisulphite.

7. A process according to claim 1 in which the sodium dichromate is subjected to reduction by reaction in the presence of moisture with from 0.1 to 20 times the stoichiometric amount of a reducing agent selected from the group consisting of salts of sulphurous acid, sulphur dioxide, sulphurous acid, sodium dithionite and pyrogallol.

8. A process of making a particulate composition of sodium sulphate containing chromium compound impurity and having stable, freeflowing, properties from chrome saltcake feed material containing sodium sulphate and sodium dichromate impurity, the process comprising subjecting the sodium dichromate in the said cake to double decomposition by reaction in the presence of moisture with a mineral acid salt having a cation other than sodium to form a chrome saltcake product that is less susceptible to absorption of moisture that the chrome saltcake feed material, and the resulting composition is dried to freeflowing form.

9. A process according to claim 8 in which the salt is a potassium salt of a mineral acid.

10. A process according to claim 8 in which the salt is a sulphate selected from the group consisting of potassium and ammonium sulphates.

11. A process according to claim 8 in which the sodium dichromate is subjected to double decomposition by reaction with an ammonium salt, of a mineral acid to form ammonium dichromate.

12. A process according to claim 8 in which the sodium dichromate is subjected to double decomposition by reaction with an ammonium salt, of a mineral acid to from ammonium dichromate and the drying is conducted at a temperature above 200°C such that the ammonium dichromate undergoes reduction.

13. A process according to claim 8 in which the sodium dichromate is subjected to double decomposition by reaction in the presence of moisture with from 0.1 to 10 times the stoichiometric amount of an ammonium or potassium salt of a mineral acid.

* * * * *